United States Patent [19]
Mead

[11] Patent Number: 6,162,376
[45] Date of Patent: Dec. 19, 2000

[54] COMPRESSION MOLDING OF OPTICAL LENSES

[75] Inventor: Vandenberg Mead, deceased, late of Malibu, Calif., by Roxanne F. White, executrix

[73] Assignee: Mead Opthalmics, Malibu, Calif.

[21] Appl. No.: 09/257,231

[22] Filed: Feb. 24, 1999

[51] Int. Cl.[7] ................................... B29D 11/00
[52] U.S. Cl. ................ 264/2.4; 264/2.7; 425/406; 425/808
[58] Field of Search ................ 264/1.1, 2.3, 2.4, 264/2.7; 425/808, 406, 407

[56] References Cited

U.S. PATENT DOCUMENTS

| | | | |
|---|---|---|---|
| 2,298,429 | 10/1942 | Smith | 264/2.4 |
| 2,432,668 | 12/1947 | Kingston | 264/2.4 |
| 2,473,588 | 6/1949 | Johnson | 264/2.4 |
| 4,352,776 | 10/1982 | Weisner et al. | 264/2.7 |
| 4,402,659 | 9/1983 | Greenbaum | 425/808 |
| 4,564,408 | 1/1986 | Crumbach et al. | 264/1.7 |
| 5,100,590 | 3/1992 | Ruhlin | 264/2.7 |
| 5,458,820 | 10/1995 | Lefebvre | 264/2.7 |
| 5,630,967 | 5/1997 | Greshes | 264/2.4 |

*Primary Examiner*—Mathieu D. Vargot
*Attorney, Agent, or Firm*—Fish & Richardson P.C.

[57] ABSTRACT

A lens molding system which uses glass molds to mold polycarbonate blanks. The blanks are preheated, then additionally surface heated, molded, and cooled under pressure.

13 Claims, 2 Drawing Sheets

COMPRESSION MOLDING OF OPTICAL LENSES

BACKGROUND

Polycarbonate is a popular material for making ophthalmic lenses. Polycarbonate lenses are often produced by injection and compression molding of liquid resin. The conventional operation causes the lenses to remain with residual stress effects.

These residual stress effects can affect the dimensional stability of the lenses, and lead to other problems. For example, overly-stressed polycarbonate lenses can warp upon storage or wear. The edges of such lenses can have varied optical powers. A phenomena known as cold creep can also cause problems in the lenses.

SUMMARY

The presently-described system teaches a new method and apparatus for forming low stress polycarbonate lenses.

The machine and process that is described herein produces finished ophthalmic lenses by simultaneously molding both the concave and convex surfaces of these lenses under controlled pressure and even heating.

A preferred mode presses both top and bottom at the same time, and at substantially the same pressures.

Another mode uses a mold made of glass to match the coefficient of expansion of the mold more closely to the polycarbonate blank. The mold is heated and cooled using a microgranulated solid that is pressed against the mold. This provides even heating and heat spreading.

BRIEF DESCRIPTION OF THE DRAWINGS

These and other aspects of the invention and embodiments will now be described in detail with respect to the accompanying drawings, in which.

DESCRIPTION OF THE PREFERRED EMBODIMENTS

Figure 1:
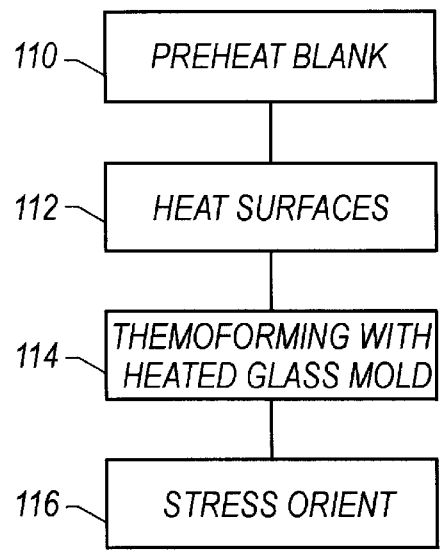
FIG. 1 shows a flow chart of an overview of the process used according to the present system.

The present system preferably operates starting with a solid polycarbonate resin blank. These blanks are commercially available. The operation follows the flowchart of FIG. 1. The resin blank is first preheated at step 110. The initial preheating brings the blank to a uniform temperature, which is at a point below the deformation point of the plastic. The surface skin of the polycarbonate resin blank is thereafter further softened at step 112, by increasing the heating to a point above the glass transition point of the plastic. In particularly preferred embodiments, the preheating brings the blank to approximately 270° F., and the supplemental heating is carried out at 305° F. The polycarbonate's internal temperature can therefore be different than its external temperature at this point.

Figure 2:
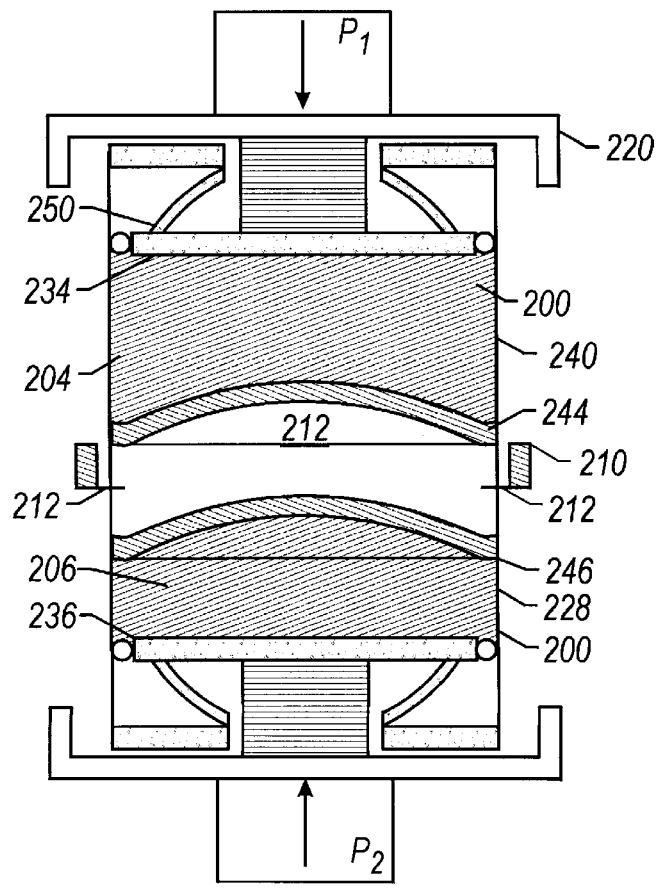
FIG. 2 shows a diagram of the molding machine used for molding the low stress polycarbonate lenses.

The blank with its softened surfaces are then thermoformed at step 114. This is done by placing the heated blank in a mold cavity 99 that is defined between two glass molds and a cylindrical dam around the edges. The details of the layout of the structure is shown and described with reference to FIG. 2, herein.

The thermoforming brings the heated external surfaces of the blank into contact with preheated glass molds. The glass molds have been heated to a higher temperature than the external surface temperature of the blank. An exemplary temperature for the molds is, e.g., 390° F.

These glass molds then press against the blank to effect the thermoforming. The pressing is carried out at relatively low pressures, e.g., between 8½ and 140 psi. A special cylindrical dam is used to control the lens thickness and the resin flow.

After thermoforming, stress orientation is carried out at step 116. The pressure is increased, e.g., doubled, preferably to a pressure between 272 and 425 psi. The thermoformed lens is allowed to cool under this higher pressure, until the lens reaches a relatively stable temperature, e.g., 235° F. Then pressure is released to leave the finished lens.

The heating and cooling of the molds are preferably carried out using a liquefied solid heat transfer medium, e.g., a non-metallic micro-pulverized solid. The heat transfer medium can be used to exert evenly-distributed high pressure of up to 1350 psi on the glass mold set and holding canisters. This helps avoid undercut from the flow of plastic during the thermoforming procedure.

The space between a concave mold and a convex mold forms the molding cavity. The thickness of the lens and rate of the viscous flow of the resin are defined by the variable-sized cylindrical dam.

Describing this in further detail, the blank that forms the starting product can be, for example, a solid resin blank prepared by injection molding of polycarbonate plastic. These blanks are commercially available. The resin blank is typically disk shaped, and has two planar surfaces that are substantially parallel to one another.

The thickness of the blank should be sufficient to allow sufficient resin volume to completely fill out the mold cavity, and yet should not be too thick so as to provide too much resin loss. The blank is also preferably smaller in diameter than the final lens. For example, an 85 mm lens can be molded from a resin blank of 75 mm in diameter.

The solid blank is preheated in a normal oven, to a temperature below the deformation point of the blank. Since the preferred polycarbonate material has a deformation point at 270°, the preferred temperature for preheating is 260°. Once the blank is uniformly heated, it is transferred to a higher-temperature oven which heats at least part of the blank above the glass transition point of the plastic. The glass transition point of polycarbonate is 305°. A suitable amount of time for the heating surfaces step 112 is, for example, 7 to 9 minutes at 370° F. By this time, it is believed that the blank is not completely heated. That is, the surfaces of the blank are more heated than the inside of the blank.

Step 114 represents the thermoforming. The preheated solid blank has softened surfaces. This preheated blank is transferred to the mold cavity described herein, which has glass molds that are preheated to 390° F., slightly higher than the supplemental heating temperature. The heat on the molds is substantially immediately cut off upon the transfer. The pressure on the mold cavity is increased from both the upper and lower side thereof. The pressure increase is substantially such that the pressure on the upper matches the pressure on the lower. Floating canisters are preferably used to balance the load on the top and bottom.

The pressure is gradually increased from an initial pressure of about 10 psi, to a final pressure near 100 psi. During the thermoforming, the resin mass viscously flows in the mold cavity.

After the lens thermoforming is finished, the lens is stress oriented at step 116. The stress orienting involves increasing the pressure level, e.g., to double the thermoforming level at the end of the viscous flow. Once reaching this pressure level, cooling starts. The preferred pressure level for stress orienting is between 272 and 425 psi. Whatever upper limit is used, the source of heat is removed after reaching that upper limit, and the lenses are cooled to below their glass transition point, a point below their deformation temperature. The preferable level is 235°. At this point, the finished lens is removed from the mold cavity. The combined cycle of thermoforming and stress orienting takes between 22 and 23 minutes.

The thermoforming is preferably carried out using glass molds. Prior systems taught away from glass molds, e.g., because of the high temperatures and pressures involved. The lower temperatures and pressures of the present system enable the use of glass molds. Moreover, it has been found that certain advantages, including excessive shrinking is avoided when such a glass mold is used. The inventor postulated that this is due to the closer thermal expansion coefficient of the glass-polycarbonate system as compared with steel-polycarbonate matches used in the prior art.

A liquefied/micropulverized solid medium preferably presses again the glass mold. This also provides an improved controlled heating/cooling transfer technique.

Another important feature is that the pressure exerted by the glass mold on the resin mass be even and sustained during the entire cooling period. This causes stress relaxation as well as stress orientation, during the cooling between 320 and 235° F.

Polycarbonate lenses have been produced by this process, and they exhibit excellent geometric curves and optical power, improved dimensional stability, low stress patterns, and superior impact strength. The comparison follows, with lenses produced by the present process being labelled as "stress oriented polycarbonate:

| Test Procedures | Injection Molded Polycarbonate (1) | Stress Oriented Polycarbonate (2) |
|---|---|---|
| Geometric Curves Spherometer Deviation | 9 to 23 × $10^{-4}$ in | 4 to 5 × $10^{-4}$ in |
| Optical Powers Lensometer Reading | weakening of powers toward the edges | constant powers up to the edges |
| Internal Stress Polaroscope Pattern | appreciable stress | minimized stress |
| Impact Strength | 22 to 25 | 19 to 22 |
| Surface Hardness (4) Extreme Impact (5) | fracture with tear propagation | surface deformation |

Notes -
(1) Commercial polycarbonate ophthalmic lenses made by Gentex and Orcolite.
(2) The stress orientation process is supported by evidence of excellent geometric curves, dimensional stability and impact strength of the lenses made by the process of this invention.
Additional analytical tests are intended for the proof of stress orientation. It is planned to run comparative evaluations of injection molded vs. stress oriented polycarbonate films for materials strength (tensil, modulus and tear), circularly polarized infrared and laser/Raman spectra and x-ray diffraction patterns.
(3) Apparent warping of samples stored at room temperature over a period of one year.
(4) Readings from Barber-Colman surface impression tester.
(5) Successive blows from a 2 lb. steel hammer.

A preferable value for molding a finished ophthalmic lens is between 1.5 to 5 mm in its center. However, unlike this typical value, the system formed by the present specification can produce finished polycarbonate ophthalmic lenses that are 0.4 mm or possibly even less thick. Such devices can also have 1.0 mm edges with excellent geometric curves. However, any central thickness between 1 and 4 mm is preferred according to this process.

Higher diopter lenses may require thicker edges relative to the centers. Cylindrical dams, as described herein, define the molding cavity. These higher diopter lenses may require insulation to prevent heat loss at the edges of the lens.

The specific equipment used to carry out the process described above is shown in FIG. 2. This system uses two floating canisters 200, 202. The floating canisters are effectively pistons which can be separately controlled. A glass mold 204 is held by the floating canister 200, and another glass mold 206 is held by the other canister 202 respectively at the end of the floating canister. The glass molds 204 and 206 can hence be moved towards one another and pressurized relative to one another.

Cylindrical dam 210 defines the edge of the molding cavity of the lower canister 202. The cylindrical dam 210 rests on a ledge 212 to hold the molded lens into place.

According to a specifically preferred embodiment, the pressures exerted by respective platform pistons 220 and 222 on the floating convex mold 206, and the floating concave mold 204, are equal. The thrust cylinders, e.g., 224, transmit the pressure from the associated platform pistons 220.

The walls of the canisters 228 are preferably formed of stainless steel. Similarly, the thrust cylinders 224 preferably include stainless steel or other heat conducting parts. These walls and cylinders allow transmittance of heat through the conductor material. The pressure plates 234, 236 are preferably planar plates that are respectively but symmetrically driven by the pressures $P_1$ and $P_2$.

The plates, e.g., 234, press against a liquefied heat conductance medium 240 to press that medium against the molds. In a most particularly preferred mode, the heat conductance medium is micro-pulverized salt, corundum, or another non-metallic, free-flowing solid that has a suitable heat conductance and compressiveness.

The material must be held within the chamber between the glass mold 204 and the pressure plate 234. An O-ring 242 rests between the pressure plate 234 and walls 228 and seals off the edges of the chamber.

The top glass mold 204 is held by a holding lip 244. A lower lip 246 can be provided to hold the lower glass mold in place. However, while the resin mass is viscously flowing, the resin mask could be lodged under the holding lips 244, 246. In order to avoid this, the solid medium 240 needs to be pressurized against the glass molds 204, 206. A spring is preferably used to maintain this constant pressure. For example, a Bellevue spring 250 may be pre-tensioned into place to provide a constant pressure, e.g., 1350 psi, on the pressure plate 234. The spring may be held in place relative to the threaded rod 224, by screwing a screw plate 252 on the threaded rod 224 and threading to the point where it presses against the spring of the floating canisters.

The cylindrical dam 210 controls the rate of viscous flow and hence controls the lens thickness. The molding cavity 99 is hence defined by outer surfaces of the glass molds 204, 206, and the inner surfaces of cylindrical dam 210. A cross-section of the cylindrical dam is preferably slanted at approximately 35° in order to facilitate removal of the finally-molded lens.

The glass molds 204, 206 are preferably formed of tempered glass. This improves the resistance of the mold to temperature and pressure.

In operation, the solid blank is first preheated, and then supplementally heated, as noted above. The blank is placed into the molding cavity 99. Pressure is substantially equally applied through both the top and bottom platform pistons, 234, 236. The pressure applied to the top substantially equals the pressure applied to the bottom. These pressures are applied at equal rate and from opposite directions. Once the lens is thermoformed in this way, pressure is increased, and temperature is decreased. The pressure remains until the lens cools sufficiently to be removed from the mold.

The preferred system uses glass molds which are formed from tempered glass for improved operation. While glass molds are preferred, molds of other materials may alternatively be used. Preferable materials for the molds include those materials which have a similar coefficient of expansion and contraction to that of the material being molded. One other preferred material for the mold is nickel. Nickel can be formed electrolytically. Other metals can alternatively be used if the liquefied solid medium can be sufficiently held in heat transfer contact with the canisters 200, 202, such that differences in the resulting shrinkage control at the metal-polycarbonate interface can be minimized. Hence, this alternative system can prevents stresses in the molded lens even with a metal mold.

The edges of the metal molds are preferably adequately tensioned in order to exclude undercutting from the viscous flow of the resin mask.

An alternative embodiment accommodates certain prescription lenses, herein Rx lenses, through prisming of the ophthalmic lenses. Prisming represents the act of moving the optical centers of the lens to a non-central location. This is typically necessitated by the anatomy of the wearer of the lenses. Prismed lenses have an optical center which is no longer its geometrical center. Proper geometric centering of commercial lenses can be accomplished using a finished lens blank. The overall size of the lens blank allows the geometric center to be positioned to meet the prescription while cutting and mounting the lens into a selected frame. Prisming needs to be accomplished, however, typically by additional grinding and polishing.

Figure 4:
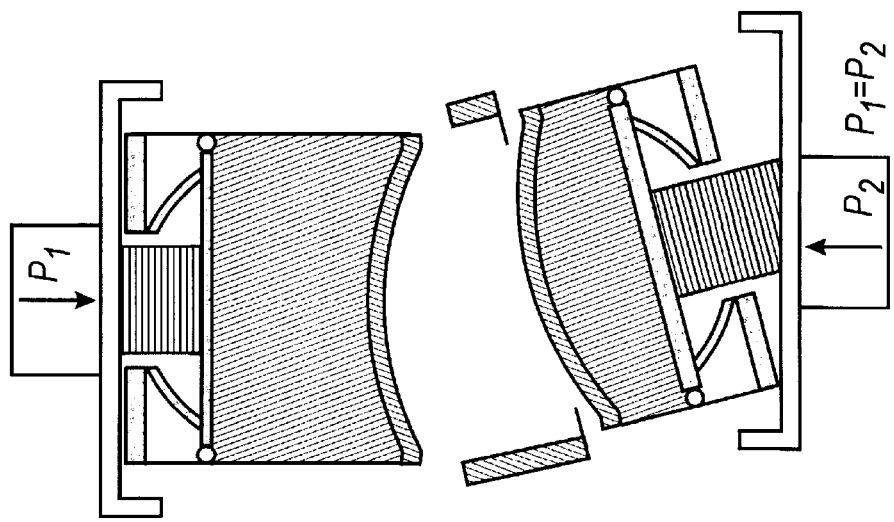
FIG. 4 shows the machine used for a prescription lens.
Figure 3:
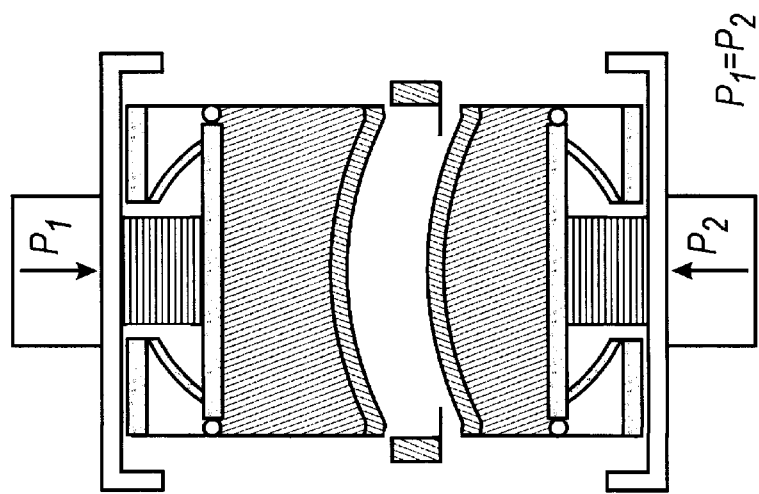
FIG. 3 shows the machine used for a normal lens.

The preferred system of this embodiment can accommodate additional prisming by changing the position of the thrust cylinder. FIGS. 3 and 4 show the operation of prisming the thrust cylinder and the cylindrical dam. FIG. 3 shows the thrust cylinder with and without prisming, and FIG. 4 shows the cylindrical with and without prisming. The molding can be prismed for prescription lenses. One-half of the optical device is tilted relative to the other half, thereby forming a finished polycarbonate lens that does not require grinding and polishing of the lenses.

Although only a few embodiments have been described in detail above, those of skill in the art recognize that many modifications are intended and predictable from the disclosed embodiments. For example, All such modifications are intended to be encompassed within the following claims.

What is claimed is:

1. A method of forming a polycarbonate lens, comprising:

obtaining a polycarbonate blank to be molded into a lens;

preheating the polycarbonate blank to a specific temperature below a deformation point of the polycarbonate material for a time effective to uniformly heat the polycarbonate material;

raising a temperature of only outer surfaces of the polycarbonate material to a second higher temperature, but below a glass transition point of the polycarbonate material, to soften the surface of the polycarbonate material;

preheating top and bottom molds to a third temperature, higher than said second temperature to form preheated molds;

pressing the heated polycarbonate blank between respective first surfaces of said preheated molds, using a substantially same pressure to press from the bottom as is used to press from the top.

2. A method as in claim 1 further comprising spring biasing a heating medium against a second surface of each said mold, said second surface being opposite from the first surface that presses against the polycarbonate blank.

3. A method as in claim 2 wherein said heating medium is a microgranulated solid.

4. A method as in claim 3 wherein said pressing is carried out along a straight axial line.

5. A method as in claim 3 wherein said pressing is carried out along a bent axial line.

6. A method as in claim 1 further comprising, after pressing the lens, allowing the lens to cool under pressure.

7. A method as in claim 1 further comprising, after pressing the lens, increasing the pressure to between 272 and 450 psi, allowing the lens to cool under said pressure, and removing the lens after the lens has cooled.

8. A method as in claim 6 wherein said pressures are effective to compress the lens without causing stress in the lens.

9. A method as in claim 1, wherein said molds are glass molds.

10. A polycarbonate lens molding apparatus, comprising:

a first glass mold, having a convex molding surface, and having a second surface facing away from said convex molding surface;

a second glass mold, having a concave lens molding surface, and having a second surface facing away from said concave molding surface;

a microgranulated heating medium in contact with said second surfaces of both said first and second molds;

a spring element, pressing said microgranulated heating medium against said second surfaces and a pressure applying device, operating to apply substantially constant pressure to both said first and said second molds, to press a polycarbonate lens between said convex surface and said concave surface.

11. An apparatus as in claim 10 further comprising a mold-holding element, located at least at one position surrounding said mold to hold the mold into place, the spring element pressing the heating medium against said mold to press the mold edges against the mold-holding element.

12. An apparatus as in claim 10 wherein said microgranulated heating medium is a micro-pulverized liquefied solid.

13. An apparatus as in claim 10, further comprising a cylidrical dam, surrounding a molding area.

* * * * *

UNITED STATES PATENT AND TRADEMARK OFFICE
CERTIFICATE OF CORRECTION

PATENT NO.    : 6,162,376
DATED         : DECEMBER 19, 2000
INVENTOR(S)   : VANDENBERG MEAD

It is certified that error appears in the above-identified patent and that said Letters Patent is hereby corrected as shown below:

ON THE TITLE PAGE
Item [73] Assignee, please replace

"Opthalmics" with --Ophthalmics --.

Signed and Sealed this

Twenty-ninth Day of May, 2001

Attest:

NICHOLAS P. GODICI

Attesting Officer    Acting Director of the United States Patent and Trademark Office